May 23, 1933.  J. S. ABERCROMBIE ET AL  1,910,663

FLUID PRESSURE OPERATED VALVE

Original Filed Jan. 29, 1929

JAMES S. ABERCROMBIE
&
WALTER E. KING INVENTOR.

BY Jesse R. Stone

ATTORNEY.

Patented May 23, 1933

1,910,663

UNITED STATES PATENT OFFICE

JAMES S. ABERCROMBIE AND WALTER E. KING, OF HOUSTON, TEXAS

FLUID PRESSURE OPERATED VALVE

Substitute for abandoned application Serial No. 335,986, filed January 29, 1929. This application filed May 4, 1931. Serial No. 534,920.

Our invention relates to valves or rams adapted to close the passage through a pipe or casing. It is adapted particularly for use in oil field work and may be employed at the upper end of the casing as a master valve or may be used in pipe lines where fluid is flowing under pressure.

It is the object of our invention to provide a valve or ram for closing the passage through the pipe which is adapted to be easily moved to closed position under pressure of the fluid in the line.

We contemplate equalizing the pressure on both sides of the ram so that there will be little opposition to the movement of the valve and so that it will be necessary only to overcome friction in closing the valve under pressure of the fluid.

We aim to provide a valve which may be operated by fluid pressure and in which the operating mechanism and the valve are placed in balanced arrangement upon the pipe to be closed so that the apparatus will be symmetrically arranged on both sides of the pipe.

It is also an object to provide apparatus for controlling the flow of pressure fluid for the operation of the valve in the most convenient manner.

Figure 1:
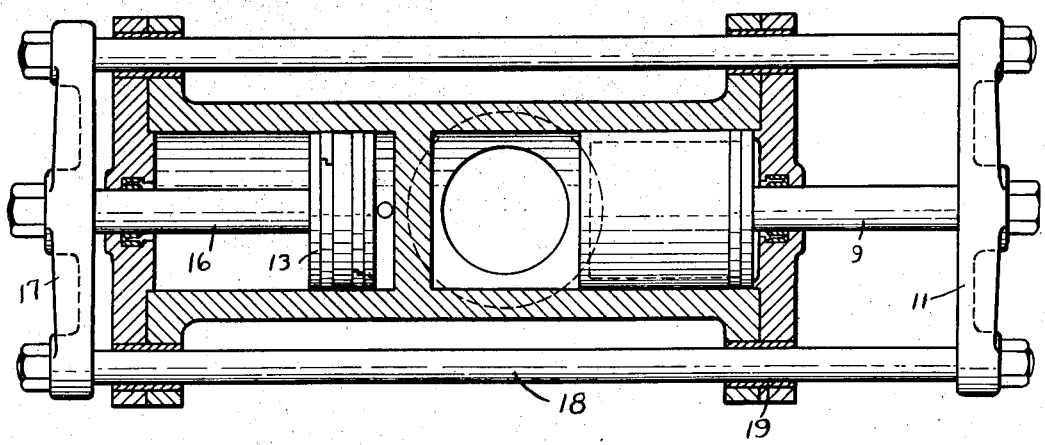

Referring to the drawing herewith, Fig. 1 is a longitudinal section through the valve cylinder and operating means.

Figure 2:
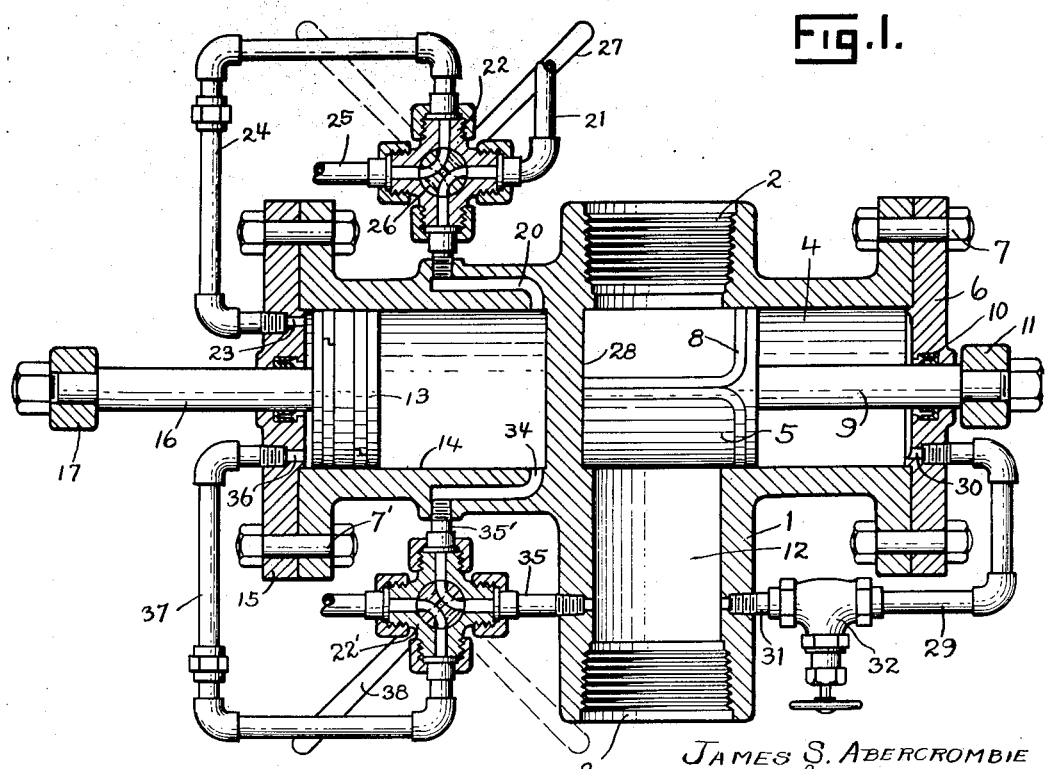

Fig. 2 is a section taken at right angles to the section shown in Fig. 1, the section being taken longitudinally of the line in which the valve is used.

This application is a substitute for our previous application Serial No. 335,986, filed January 29, 1929.

In Fig. 2 the body member 1 is of tubular construction and is threaded at the ends 2 and 3 for connection in a fluid conducting line, which, as previously stated, may be the casing of the well or may also be a line of pipe through which fluid is adapted to flow under pressure. At one side of the body member 1 and communicating therewith is a cylinder or bonnet 4 for a piston valve 5. The bonnet is shown as formed integral with the body member 1 and is closed at its outer end by a plate 6 bolted at 7 to the flaring flange on the outer end of the cylinder.

The valve or ram 5 is cylindrical in shape to fit closely within the cylinder 4. It has packing 8 arranged thereon to prevent the passage of fluid outwardly past the valve into the cylinder 4. The said valve has a stem 9 projecting through the center of the end plate 6 and forming a fluid tight fit therewith through means of a stuffing box 10. The valve stem projects beyond the end of the cylinder and is connected with a yoke 11 at its outer end.

The ram 5 is adapted to be operated to and from the passage 12 through the body member by means of a fluid operated piston 13 fitting within a cylinder 14 formed on the side of the body 1 opposite to the ram 5. The piston is movable within the cylinder 14, the inner end of the said cylinder being closed by the wall of the body member 1. The outer end of the cylinder is closed by a plate 15, similar in all respects to the plate 6, said plate being secured in position by bolts 7'.

The piston 13 has a piston rod 16 thereon extending through the plate 15 and connected at its outer end to a transverse yoke or cross head 17.

Referring now to Fig. 1, it will be seen that the yoke 11 and the yoke 17 on opposite sides of the body of the device are connected together by means of rods or connecting members 18. The valve stem 9 and the piston rod 16 are in axial alignment and the connecting members 18 have bearings at 19 in the flanges of the cylinders, as will be easily understood. When the valve ram and the piston are thus operatively connected it will be obvious that the movement of the piston 13 will cause the movement of the ram in the same direction.

The piston is moved by pressure fluid, which ordinarily will be steam. An inlet port for the steam on the inner end of the cylinder 14 is formed at 20. This port is connected with a supply pipe 21 leading to a source of pressure fluid. A valve, shown at 22, is arranged in connection with the pipe 21 to allow for the direction of the pressure fluid either to the cylinder or to exhaust. The outer end of the cylinder 14 has an inlet part 23 leading to the pipe 24, which is connected with the four-way valve 22. A lateral exhaust pipe 25 is connected with the valve and it will be observed that the operation of the central core 26 of the valve through the lever 27 will enable the operator to connect the steam line 21 with either of the two inlet ports 20 or 23, and when the steam line is thus connected the opposite end of the cylinder will be connected with the exhaust 25.

When the valve or ram 5 is operated under heavy pressure in the passage 12 the back pressure against the forward end 28 of the ram will resist the closing movement thereof. We have arranged to balance the pressure on the valve so that it will be equal at both ends. This is accomplished by connecting the outer end of the cylinder 4 with the pressure side of the valve passage 12. This is done by a pipe 29 connected with a port 30 in the cylinder plate 6 and at its opposite end with a nipple 31 in the valve body on the up-stream side of the ram. A hand-operated valve 32 in the pipe 29 serves to control passage of fluid therethrough. From an inspection of Fig. 2 it will be obvious that the pressure fluid from the passage 12 may be directed into the outer end of the cylinder 4 so that there will be an equalization of pressure from the line on both ends of the ram.

We have also arranged to connect the passage 12 with the operating cylinder 14 so that the line pressure may be employed in assisting the operation of the ram. A four-way valve 22', similar in construction to the valve 22, is arranged to control the passage of fluid from the body member 1 to either end of the cylinder 14. An inlet port 34 at the inner end of the cylinder 14 is connected through the valve 22' with the pipe 35 connected with the body 1. There is a port 36 formed in the outer end of the cylinder 14 which is connected by the pipe 37 with the valve 22'. A manipulation of the handle 38 of the valve will enable the pressure fluid from the passage 12 to be directed to either end of the cylinder 14 in an obvious manner.

It is contemplated that when the ram 5 is to be closed quickly and steam pressure is not available that the said ram 5 may be moved to closed position through the pressure of fluid on the up-stream side of the passage 12. The valve 32 will be open to allow an equalization of pressure at both ends of the ram and the valve 22' will be turned to connect the pipes 35 and 35' so as to conduct the pressure fluid through the port 34 to the inner side of the piston 13. As the pressure on the ram is balanced the pressure fluid from the passage 12 will be sufficient to overcome the frictional resistance caused by the closing movement of the valve so that the valve may be moved to its seat, closing the passage 12. We have thus provided an automatically closing valve which when properly adjusted will be moved to closed position and remain closed. It is capable, however, of being operated directly by steam, gas or air pressure and may be positively closed or opened at any time independent of the pressure in the line. It will be possible to leave the pipe 29 open during usual operating conditions so that the valve may be easily moved when necessary. The valve may then be operated either by steam or by pressure in the passage 12 through the manipulation of the valve 22'. The construction of the valve whereby the apparatus is symmetrically balanced at each side of the fluid-conducting line not only adds to the ease of operation of the device but makes it possible to assemble the same in situations where it would otherwise be difficult.

What we claim as new is:

1. A gate valve including, a housing, a passage therethru, a ram adapted to close said passage, a piston operable within said housing to move said ram, but disposed on the opposite side of said passage from said ram, means without said housing connecting said ram and said piston, means to move said piston in either direction, and means to equalize the pressure on both sides of said ram, when said ram is moved to open said passage.

2. A gate valve including, a housing, a passage therethru, a ram adapted to close said passage, a piston operable within said housing to move said ram, but disposed on the opposite side of said passage from said ram, means without said housing connecting said ram and said piston, fluid pressure controlled means to move said piston, and additional means to automatically equalize the pressure on both sides of said ram when said ram is moved in either direction to open or close the same.

3. A gate valve including, a housing, a passage therethru, a ram adapted to close said passage, a piston operable within said housing to move said ram, but disposed on the opposite side of said passage from said ram, means without said housing connecting said ram and said piston, additional means whereby pressure in said passage may be admitted to said piston, and additional means whereby the pressure on both sides of said ram may be equalized when said ram is moved to open position.

4. A gate valve including, a housing, a passage therethru, a ram adapted to close said passage, a piston operable within said housing to move said ram, but disposed on the opposite side of said passage from said ram, means without said housing connecting said ram and said piston, means to move said piston, additional means whereby pressure in said passage may be admitted to either side of said piston, and additional means whereby the pressure on said ram may be equalized.

5. A gate valve including a housing, a pair of coaxial cylinders therein, a transverse partition between said cylinders, a passage traversing one of said cylinders, means to close said passage, pressure operable means in the other of said cylinders, and connecting members outside of said housing to cause simultaneous movement of said two means.

6. In a valve, a housing, extended flanges at each end thereof, a pair of rods extending along said housing and thru said flanges, cross heads carried by said rods, a piston and a ram disposed in said housing and each connected to a cross head, a solid partition separating said piston and ram, and fluid pressure means to move said piston whereby said ram is moved by said rods.

7. In a valve, a body, a passage therethru, a pair of coaxial cylinders being radial in their relation to said passage, a closed partition separating said cylinders, a ram in one of said cylinders, said ram being slidably adapted to close said passage, a piston in the other of the said cylinders, means connecting said piston with said ram, means of introducing a pressure fluid to operate said piston, and means to equalize the pressure on each end of the said ram.

8. A valve for closing the passage in high pressure lines including a housing, a ram to close the line, a piston to actuate said ram and disposed on the diametrically opposite side of said passage therefrom, and means to equalize the pressure on either side of said piston with the pressure in said passage whereby said pressure will move said piston.

In testimony whereof we hereunto affix our signatures, this the 28th day of April A. D., 1931.

JAMES S. ABERCROMBIE.
WALTER E. KING.